(12) United States Patent
Matsuhara et al.

(10) Patent No.: US 10,811,678 B2
(45) Date of Patent: Oct. 20, 2020

(54) NEGATIVE ELECTRODE MATERIAL AND LITHIUM SECONDARY BATTERY USING SAME

(71) Applicant: TOYOTA JIDOSHA KABUSHIKI KAISHA, Toyota-shi, Aichi-ken (JP)

(72) Inventors: Shinsuke Matsuhara, Miyoshi (JP); Kazuhisa Takeda, Toyota (JP)

(73) Assignee: TOYOTA JIDOSHA KABUSHIKI KAISHA, Toyota-shi, Aichi-ken (JP)

(*) Notice: Subject to any disclaimer, the term of this patent is extended or adjusted under 35 U.S.C. 154(b) by 176 days.

(21) Appl. No.: 16/182,865

(22) Filed: Nov. 7, 2018

(65) Prior Publication Data

US 2019/0140268 A1     May 9, 2019

(30) Foreign Application Priority Data

Nov. 8, 2017 (JP) ................. 2017-215563

(51) Int. Cl.
| | |
|---|---|
| *H01M 4/36* | (2006.01) |
| *H01M 4/62* | (2006.01) |
| *H01M 4/587* | (2010.01) |
| *H01M 4/133* | (2010.01) |
| *H01M 10/0525* | (2010.01) |
| *H01M 4/02* | (2006.01) |

(52) U.S. Cl.
CPC .......... *H01M 4/366* (2013.01); *H01M 4/133* (2013.01); *H01M 4/587* (2013.01); *H01M 4/628* (2013.01); *H01M 10/0525* (2013.01); *H01M 2004/027* (2013.01)

(58) Field of Classification Search
CPC .............................. H01M 4/133; H01M 4/366
USPC .......................................................... 429/215
See application file for complete search history.

(56) References Cited

U.S. PATENT DOCUMENTS

| | | |
|---|---|---|
| 2010/0209782 A1 | 8/2010 | Choi et al. |
| 2015/0140439 A1 | 5/2015 | Hasegawa |
| 2016/0056436 A1 | 2/2016 | Haruna et al. |

FOREIGN PATENT DOCUMENTS

| | | |
|---|---|---|
| JP | 2010-192430 A | 9/2010 |
| JP | 2014-002953 A | 1/2014 |
| WO | 2014/162529 A1 | 10/2014 |

*Primary Examiner* — James M Erwin
(74) *Attorney, Agent, or Firm* — Sughrue Mion, PLLC

(57) ABSTRACT

According to the present invention, there is provided a negative electrode material for a lithium secondary battery, including a negative electrode active material including a carbon material and having an $I_D/I_G$ ratio of XPS of 0.2 to 0.74, and a coating portion disposed on a surface of the negative electrode active material. The coating portion has a boron atom and a crosslinking site having a bonding portion of C—O—C and interposed between the boron atom and the negative electrode active material. In an XPS spectrum, when an area of the peak of the 1s electron orbital of the boron atom is denoted by Ab and an area of the peak of the C—O—C bonding portion is denoted by Ac, the ratio Ac/Ab of the peak area Ac to the peak area Ab is 0.11 or more and 0.51 or less.

7 Claims, 4 Drawing Sheets

NEGATIVE ELECTRODE MATERIAL AND LITHIUM SECONDARY BATTERY USING SAME

CROSS REFERENCE TO RELATED APPLICATIONS

This application claims the benefit of priority to Japanese Patent Application No. 2017-215563 filed on Nov. 8, 2017. The entire contents of this application are hereby incorporated by reference.

BACKGROUND OF THE DISCLOSURE

1. Field

The present invention relates to a negative electrode material and a lithium secondary battery using the same.

2. Background

In lithium secondary batteries, further improvement of durability has been investigated as a part of performance improvement. In relation to this, for example, WO 2014/162529 discloses a negative electrode material having a coating layer made of a boric acid ester compound on the surface of a negative electrode active material, and a lithium secondary battery using this negative electrode material.

SUMMARY

In the abovementioned negative electrode material, the boric acid ester compound is adsorbed on the surface of the negative electrode active material by the adsorbing action of boron atoms. However, the negative electrode active material undergoes repeated expansion and contraction as the battery is charged and discharged. In particular, when charge and discharge cycles are performed at a high rate of 2 C or more, the negative electrode active material undergoes rapid repeated expansion and contraction. As a result, the coating layer (boric acid ester compound) gradually desorbs from the negative electrode active material in the course of charge and discharge cycles, and the effect of the coating may decrease. The resulting problem is that the internal resistance increases after the charge and discharge cycles and the battery characteristics deteriorate.

The present invention has been accomplished with the foregoing in view, and an object of the present invention is to provide a negative electrode material making it possible to produce a lithium secondary battery excellent in cycle characteristics. Another related object is to provide a lithium secondary battery in which an increase in internal resistance after charge and discharge cycles is suppressed and which has excellent cycle characteristics.

According to the present invention, there is provided a negative electrode material for a lithium ion secondary battery, comprising: a negative electrode active material which includes a carbon material and in which a ratio $I_D/I_G$ of an intensity $I_D$ of a D peak appearing at a position of 1350 cm$^{-1}$ to an intensity $I_G$ of a G peak appearing at a position of 1580 cm$^{-1}$ in a Raman spectrum measured by laser Raman spectroscopy using an argon laser is 0.2 or more and 0.74 or less, and a coating portion disposed on a surface of the negative electrode active material. The coating portion includes a boron (B) atom and a crosslinking site having a C—O—C bonding portion and interposed between the boron atom and the negative electrode active material. In an XPS spectrum measured by X-ray photoelectron spectroscopy, when an area of the peak of the 1s electron orbital of the boron atom, which appears at a position with a bond energy of 193 eV to 194 eV, is denoted by Ab and an area of the peak of the C—O—C bonding portion, which appears at a position with a bond energy of 287 eV to 288 eV, is denoted by Ac, a ratio Ac/Ab of the peak area Ac of the C—O—C to the peak area Ab of the boron atom is 0.11 or more and 0.51 or less.

In the negative electrode material, the coating portion is disposed on the surface of the negative electrode active material by using the chemical bond of C—O—C. Therefore, the coating portion can be more firmly held on the surface of the negative electrode active material as compared with the method utilizing the adsorbing action of boron disclosed in WO 2014/162529. As a result, even when the negative electrode active material undergoes repeated expansion and contraction, the coating portion is less likely to separate from the negative electrode active material, and the effect of the coating portion can be exhibited for a long period of time. Therefore, it is possible to suppress an increase in internal resistance and to suppress deterioration of battery characteristics even after charge and discharge cycles.

In a preferred embodiment of the negative electrode material disclosed herein, the composition ratio of the boron atoms calculated based on the peak area Ab of the XPS spectrum is 0.27 atomic % or more when the total of all atoms is 100 atomic %. As a result, the effect of including boron atoms in the coating portion is better exhibited, and the resistance of the negative electrode can be further reduced at a higher level.

In a preferred embodiment of the negative electrode material disclosed herein, the coating portion includes a dehydration condensate of a boron compound having a hydroxyl group and a polyol. The coating portion includes, for example, a dehydration condensate of boric acid and polyvinyl alcohol (PVA). In this case, the mass ratio of the polyvinyl alcohol to the boric acid is preferably 1 to 5. As a result, the effect of the technique disclosed herein is exhibited at a higher level, and the resistance of the negative electrode can be further reduced at a higher level.

Prior art documents relating to boron compounds and PVA are exemplified by Japanese Patent Application Publications No. 2014-002953 and No. 2010-192430. For example, Japanese Patent Application Publication No. 2014-002953 discloses a method for producing a separator having a porous base material and a heat-resistant layer by coating a coating solution including boric acid, PVA and an inorganic filler on the surface of the porous base material. Further, Japanese Patent Application Publication No. 2010-192430 discloses a nonaqueous electrolytic solution including an oxalatoborate-base additive. However, none of these documents describe anything that directly discloses or indirectly suggests the technique disclosed herein.

In a preferred embodiment of the negative electrode material disclosed herein, the negative electrode active material is amorphous coated graphite. This makes it possible to suitably realize a negative electrode material in which the coating portion is formed homogeneously and/or densely on the surface of the negative electrode active material. In addition, there is also an advantage that the $I_D/I_G$ ratio can be easily adjusted within the above range.

According to the present invention, there is also provided a lithium secondary battery comprising the negative electrode material in a negative electrode. Such a lithium secondary battery has, for example, low initial resistance and excellent high-rate cycle characteristic such that reduction in battery capacity is unlikely to occur even in repeated high-rate charging and discharging at a charge and discharge rate of 2 C or more.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Figure 1:
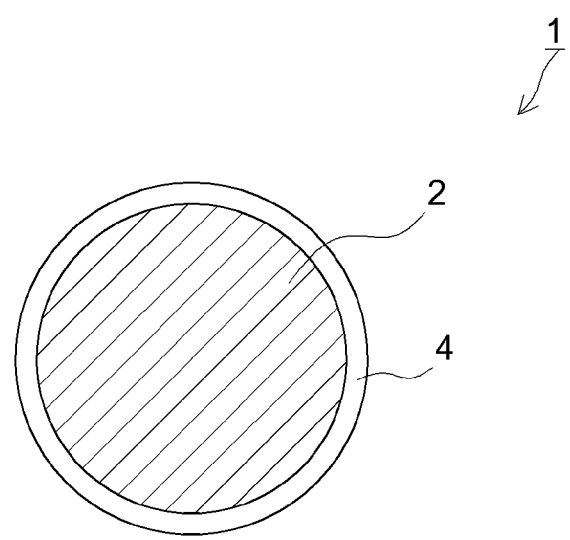
FIG. 1 is a schematic view showing a cross-sectional structure of a negative electrode material according to one embodiment.

A preferred embodiment of the present invention will be described below with reference, as appropriate, to the appended drawings. Incidentally, matters other than those particularly mentioned in the present specification (for example, the composition and properties of the negative electrode material) and necessary for the implementation of the present invention (for example, other constituent elements and a general battery construction process which do not characterize the present invention) can be grasped as design matters by a person skilled in the art on the basis of the related art in the pertinent field. The present invention can be implemented based on the contents disclosed in this specification and technical common sense in the field. In addition, in the following drawings, the same reference numerals are given to the members/parts that exhibit the same action, and redundant explanation may be omitted or simplified. The dimensional relationship (length, width, thickness, and the like) in each drawing does not necessarily reflect the actual dimensional relationship. Further, in the present specification, when numerical ranges are represented as A to B (where A and B are arbitrary numerical values), it means A or more and B or less.

[Negative Electrode Material]

Figure 2:
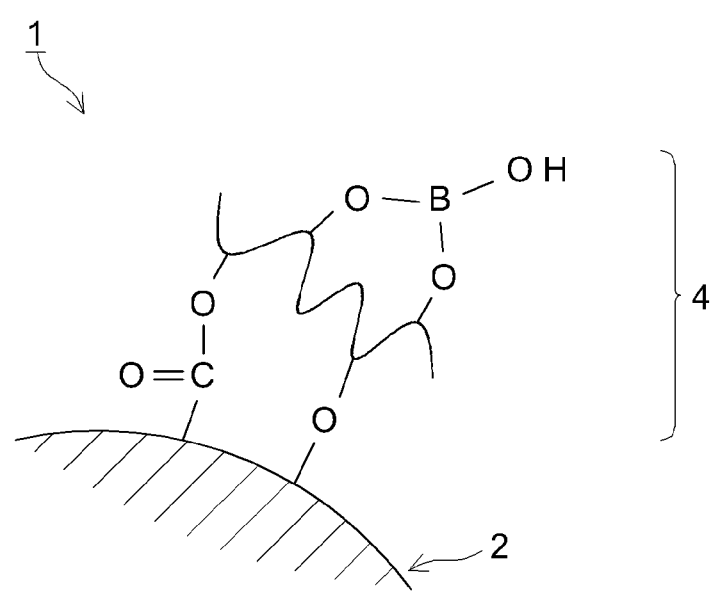
FIG. 2 is an enlarged schematic view of the surface of the negative electrode material.

FIG. 1 is a schematic view showing a cross-sectional structure of a negative electrode material 1 according to one embodiment. FIG. 2 is an enlarged schematic view of the surface of the negative electrode material 1. Although not intended to be particularly limiting, in the following, the technique disclosed herein will be specifically described with the negative electrode material 1 as an example.

The negative electrode material 1 is a material to be used for the negative electrode of a lithium secondary battery. The negative electrode material 1 is a composite particle. The negative electrode material 1 includes a negative electrode active material 2 and a coating portion 4. The negative electrode active material 2 is a core portion of the negative electrode material 1. The coating portion 4 is disposed on the surface of the negative electrode active material 2. The coating portion 4 is a portion that covers at least a part of the surface of the negative electrode active material 2 and suppresses contact between the negative electrode material and other battery constituent elements (for example, a nonaqueous electrolyte).

The negative electrode active material 2 is a material capable of reversibly occluding and releasing lithium ions as charge carriers. In a Raman spectrum measured by laser Raman spectroscopy using an argon laser of the negative electrode active material 2, a ratio $I_D/I_G$ of an intensity $I_D$ of a D peak appearing at a position of 1350 cm$^{-1}$ to an intensity $I_G$ of a G peak appearing at a position of 1580 cm$^{-1}$ is 0.2 or more and 0.74 or less. The $I_D/I_G$ ratio is the ratio of the intensity $I_D$ of the D peak reflecting the irregular structure to the intensity $I_G$ of the G peak reflecting the regular graphite structure and is called an R value. In this specification, the $I_D/I_G$ ratio may be also referred to as "R value".

The R value is an index representing the amount of surface functional groups present on the surface of the negative electrode active material 2. That is, the fact that the R value is large means that the amount of surface functional groups, typically oxygen-containing groups such as a hydroxyl group (—OH group) and a carboxyl group (—C(=O)OH group), present on the surface of the negative electrode active material 2 is large (see FIG. 3). A surface functional group is a site with high reaction activity. The coating portion 4 is chemically bonded to the surface functional group on the surface of the negative electrode active material 2. By setting the R value to be equal to or larger than a predetermined value, it is possible to realize the negative electrode material 1 in which the coating portion 4 is formed densely and/or tightly. From the above viewpoint, the R value may be approximately 0.3 or more, for example, 0.4 or more. Meanwhile, as the R value decreases, the proportion of the basal plane with low reactivity on the surface of the negative electrode active material 2 increases. As a result, the reactivity between the negative electrode active material 2 and the nonaqueous electrolyte is reduced, and irreversible capacity is suppressed. In addition, it is possible to suppress the formation of a high-resistance film including the decomposition product of the nonaqueous electrolyte on the surface of the negative electrode active material 2. Therefore, by making the R value equal to or less than the predetermined value, the internal resistance can be reduced and the cycle characteristics can be improved. From the above viewpoint, the R value may be about 0.7 or less, for example, 0.6 or less.

The negative electrode active material 2 includes a carbon material. The negative electrode active material 2 may be composed of a carbon material or may include one or two or more materials known to be generally usable as a negative electrode active material in addition to the carbon material. The type of the carbon material is not particularly limited. Examples of the carbon material that can satisfy the R value range include a mixture or a composite of two or more kinds of carbon materials having different crystallinity. One preferred example is a graphite-based carbon material including a graphite material such as natural graphite or artificial graphite and at least one of non-graphitizable carbon, easily graphitized carbon and activated carbon. In this specification, the term "graphite-based carbon material" refers to a carbon material having a proportion of graphite of about 50% by mass or more, typically 80% by mass or more. Among them, amorphous coated graphite in which the surface of graphite is coated with a carbon material having low crystallinity is preferable. Generally, a carbon material having low crystallinity has a relatively large number of surface functional groups as compared with carbon material with high crystallinity. By coating the surface of the graphite material with a carbon material having low crystallinity, it is possible to suitably realize the negative electrode material 1 in which the coating portion 4 is formed homogeneously and/or densely on the surface of the negative electrode active material 2. In addition, the amorphous coated graphite also has an advantage that it is easy to adjust the R value within the above range.

The amorphous coated graphite can be produced by a conventional known method. For example, first, a graphite material as a raw material and an amorphous carbon material (for example, easily graphitizable carbon) are prepared. Next, the amorphous carbon material is attached to the surface of the graphite material by a vapor phase method such as a chemical vapor deposition (CVD) method, liquid phase method, solid phase method or the like. Then, the graphite material to which the amorphous carbon material has been attached is calcined at, for example, about 800° C. to 1400° C. and carbonized, whereby amorphous coated graphite can be produced. The R value of the amorphous coated graphite can be adjusted by, for example, the R value of the raw material (graphite material and/or amorphous carbon material) to be used, the mixing ratio of the raw materials, the calcination temperature at the time of calcination, and the like.

The negative electrode active material 2 is in the form of particles. In consideration of handleability and formability of the coating portion 4, the average particle diameter (50% cumulative particle size in volume-based particle size distribution obtained by particle size distribution measurement based on laser diffraction/light scattering method) of the negative electrode active material 2 is about 0.5 μm to 50 μm, typically 1 μm to 20 μm, and for example 5 μm to 10 μm, but these ranges are not particularly limiting. The specific surface area (a BET specific surface area obtained by using a BET method to analyze the surface area measured by a constant volume adsorption method using nitrogen gas) of the negative electrode active material 2 is about 0.1 $m^2/g$ to 30 $m^2/g$, typically 0.5 $m^2/g$ to 10 $m^2/g$, preferably 1 $m^2/g$ to 5 $m^2/g$, and for example from 3 $m^2/g$ to 4 $m^2/g$.

The coating portion 4 is chemically bonded to the surface functional groups of the negative electrode active material 2. The coating portion 4 includes a boron (B) atom and a crosslinking site. The boron atom is derived from a boron compound 4a (see FIG. 3) used for forming the coating portion 4. A boron atom typically has a trivalent coordination structure. The boron atom has a function of assisting storage and release of lithium ions in the negative electrode active material 2. Specifically, the boron atom has a Lewis acidity and demonstrates an action of increasing the degree of dissociation of the lithium salt present in the vicinity thereof. As a result, the amount of lithium ions increases on the surface of the negative electrode active material 2. In addition, the boron atom is slightly negatively charged and acts to attract a lithium ion to the surface of the negative electrode active material 2. Therefore, by including the boron atom in the coating portion 4, the resistance of the negative electrode can be reduced.

The crosslinking site is interposed between the boron atom and the negative electrode active material 2. The crosslinking site is derived from a crosslinking agent 4 (see FIG. 3) used at the time of forming the coating portion 4. The cros slinking site has a function of strongly binding the boron atom to the negative electrode active material 2. That is, the crosslinking site contains a C—O—C bonding portion. The crosslinking site is bound to the surface functional group on the surface of the negative electrode active material 2 by covalent bonding of the C—O—C bonding portion.

As a result, the coating portion 4 is strongly fixed to the surface of the negative electrode active material 2, as compared with the coating layer utilizing the adsorbing action (physical bonding) as described in, for example, WO 2014/162529, and integrated with the negative electrode active material 2.

The coating portion 4 is typically a condensate of a boron compound and a crosslinking agent. The coating portion 4 is, for example, a dehydration condensate of a boron compound having a hydroxyl group and a polyol. One preferable example is a dehydration condensate of boric acid and/or a boric acid ester and polyvinyl alcohol (PVA). In the case where the coating portion 4 is composed of a dehydration condensate of boric acid and PVA, the ratio of the component derived from PVA to the component derived from boric acid is preferably 1 to 5 on a mass basis. The type of the crosslinking agent contained in the coating portion 4, for example, the type of polyol, can be confirmed by qualitative analysis using pyrolysis gas chromatography (GC-MS). Further, as shown in the test examples described hereinbelow, the mass ratio of the dehydration condensate is similar to the compounding ratio at the time of production of the negative electrode material 1. The mass ratio of the dehydration condensate can also be confirmed by the method explained in the test examples described hereinbelow.

In the XPS spectrum measured by X-ray photoelectron spectroscopy (XPS), the negative electrode material 1 has a peak Pb of the is electron orbital of the boron atom at a position where the bond energy is 193 eV to 194 eV. The peak Pb is a peak representing the presence of a boron atom in the coating portion 4. In the present specification, "having a peak Pb" means that the composition ratio of boron (B) atoms calculated from the peak area Ab of the peak Pb in the XPS spectrum is 0.1 atomic % or more when the total of all atoms (for example, boron atoms, carbon (C) atom, and oxygen (O) atoms) is taken as 100 atomic %.

The composition ratio of boron (B) atoms calculated from the peak area Ab of the peak Pb is about 0.2 atomic % or more, preferably 0.27 atomic % or more, typically 0.3 atomic % or more, and for example 0.38 atomic % or more. As the composition ratio of boron atoms increases on the surface of the negative electrode active material 2, the degree of dissociation of the abovementioned lithium salt and/or the electrostatic interaction with lithium ions increases. This makes it possible to reduce the resistance of the negative electrode at a higher level and realize excellent output characteristics. Although not particularly limited, the upper limit of the composition ratio of boron atoms may be about 5.0 atomic % or less, typically 2.0 atomic % or less, and for example 1.4 atomic % or less.

In the XPS spectrum measured by XPS, the negative electrode material 1 has a peak Pc of the C—O—C bonding portion at a position where the bond energy is 287 eV to 288 eV. The peak Pc is a peak representing a covalent bond of the boron atom and the negative electrode active material 2. In the present specification, the phrase "having a peak Pc" means that, when curve fitting is performed with respect to the peak of the C—O—C bonding portion and the peak area is obtained, the resulting area is 1.5 times or more, preferably 2 times or more the peak area obtained when only the negative electrode active material 2 is present (reference).

In the technique disclosed herein, the ratio Ac/Ab of the peak area Ac of C—O—C to the peak area Ab of the boron atom is 0.11 to 0.51. Where the Ac/Ab ratio is less than the predetermined value, the proportion of the crosslinking agent with respect to the boron atom is insufficient. Therefore, the crosslinking property between the boron atom and the negative electrode active material 2 is lowered and the amount of boron atoms in the coating portion 4 accordingly tends to decrease, or the boron atoms tend to be dissociated from the negative electrode active material 2. Meanwhile, when the Ac/Ab ratio exceeds the predetermined value, the proportion of the cros slinking agent with respect to the boron atom becomes excessive. Therefore, the surface of the negative electrode active material is covered with a cros slinking agent thereby inhibiting the storage and release of lithium ions.

By setting the Ac/Ab ratio within the above range, the effects of the technique disclosed herein can be appropriately exerted. In other words, the coating portion 4 thoroughly exerts the function of assisting the storage and release of lithium ions as described above, so that the initial internal resistance can be suppressed low. In addition, even after the charge and discharge cycles, the coating portion 4 is properly retained on the surface of the negative electrode active material 2, and the increase in internal resistance can be suppressed.

The negative electrode material 1 may have peaks other than those described hereinabove in the XPS spectrum measured by XPS. As an example, when the crosslinking agent has an unreacted (non-dehydration condensed) hydroxyl group, a peak of the 1s electron orbital of the oxygen atom can be detected at a bond energy of 532 eV to 534 eV. In the XPS, it is possible to analyze the depth from the outermost surface of the negative electrode material 1 to about 0.5 nm to 10 nm depending on the characteristics of the device.

[Method for Producing Negative Electrode Material]

The negative electrode material 1 as described above can be obtained, for example, by a production method including the following steps: (Step 1) a preparation step of preparing the negative electrode active material 2; (Step 2) a mixing step of mixing the negative electrode active material 2, the boron compound 4a having a hydroxyl group, and the crosslinking agent 4b; and (Step 3) a calcination step of calcining the mixture obtained in the mixing step. Each step will be described below.

(Step 1) Preparation Step

In this step, the negative electrode active material 2 is prepared. The negative electrode active material 2 may be any material satisfying the above-mentioned R value, in other words, having a predetermined amount of surface functional groups. For the negative electrode active material 2, commercially available products may be used, or the negative electrode active material may be produced by a conventionally known method. For example, the commercially available product may be subjected to appropriate treatment such as application of surface functional groups, pulverization, classification and the like so that the product will have the above properties (R value, specific surface area, and average particle size). In one preferred example, amorphous coated graphite satisfying the R value is prepared as the negative electrode active material 2.

(Step 2) Mixing Step

In this step, the boron compound 4a having a hydroxyl group and the crosslinking agent 4b are mixed with the negative electrode active material 2 prepared in Step 1. A solid phase method or a liquid phase method can be used as the mixing method. In one preferred example, a liquid phase method is used. First, the boron compound 4a and the crosslinking agent 4b are weighed so as to obtain a predetermined mixing ratio and mixed in a solvent to prepare a coating liquid. As the solvent, for example, water or an organic solvent having a boiling point equal to or lower than that of water (100° C. or lower) can be preferably used.

As the boron compound 4a, a boron compound having one or two or more hydroxyl groups and a tri-coordinated boron atom can be preferably used. The boron compound 4a is inclusive of inorganic boron compounds and organic boron compounds. From the viewpoint of enhancing the bonding property with the crosslinking agent 4b, the boron compound 4a preferably has two or more hydroxyl groups, for example, three hydroxyl groups, in one molecule. One preferred example of the boron compound 4a is boric acid ($B(OH)_3$). Another preferred example of the boron compound 4a is a boric acid ester compound having one or two or more B—OH bonds. For example, a boric acid ester compound represented by a following formula (I): $B(OR)_2OH$ (wherein each R is independently selected from a hydrogen atom, a halogen atom, an alkyl group and a haloalkyl group) can be preferably used.

When R in the formula (I) is an alkyl group or a haloalkyl group, the number of carbon atoms may be about 10 or less, typically 1 to 6, for example 1 to 3. R may be linear or branched. The haloalkyl group may be a group (fluoroalkyl group) having a structure in which one or two or more of hydrogen atoms (H) constituting the alkyl group is replaced with a fluorine atom (F). In a preferred embodiment, R is a hydrogen atom or an alkyl group having one carbon atom.

The crosslinking agent 4b may be a compound having two or more hydroxyl groups and causing dehydration condensation reaction under heating. The crosslinking agent 4b preferably has about 100 or more, for example, about 1000 to 5000 hydroxyl groups in one molecule. As the crosslinking agent 4b, for example, organic polymers such as polyols, polycarboxylic acids, polycarboxylic acid esters and the like can be used. Examples of the polyols include polyvinyl alcohol (PVA) represented by a following formula (II): $(-CH_2CH(OH)-)_n$, and polyvinyl alcohol type compounds such as polyvinyl acetals and modified polyvinyl alcohol. Examples of the modified polyvinyl alcohol include those obtained by modifying polyvinyl alcohol with an olefin such as ethylene or propylene, an unsaturated carboxylic acid such as acrylic acid, methacrylic acid or the like and an alkyl ester thereof, and the like.

Although not particularly limited, it is preferable that the degree of polymerization (in the case of PVA, the number n of repeating units in the above formula (II)) of the polyvinyl alcohol compound be about 100 to 10,000, for example, 1000 to 5000. In addition, the degree of saponification (value determined according to JIS K 6726: 1994) of the polyvinyl alcohol compound may be about 70 mol % or more, typically 80 mol % to 95 mol %, for example, 80 mol % to 90 mol %.

The mixing ratio of the boron compound 4a and the crosslinking agent 4b is an important parameter for realizing the above-described area ratio of the XPS spectrum. As a preferred example, when boric acid is used as the boron compound 4a and PVA is used as the cros slinking agent 4b, the mixing ratio of boric acid and PVA may be 1:1 to 1:5 as a mass ratio. In addition, the mixing ratio of the boron compound 4a to the negative electrode active material 2 is an important parameter for realizing the above-described composition ratio of boron atoms. As a preferred example, when boric acid is used as the boron compound 4a, the amount of boric acid may be 1.4 parts by mass or more based on 100 parts by mass of the negative electrode active material 2.

In the present step, the coating liquid, which includes the boron compound 4a and the crosslinking agent 4b, and the negative electrode active material 2 are then mixed at a predetermined mixing ratio. The solvent is then evaporated to dryness. It is thus possible to obtain the negative electrode active material 2 having the boron compound 4a and the crosslinking agent 4b attached to the surface thereof.

(Step 3) Calcination Step

Figure 3:
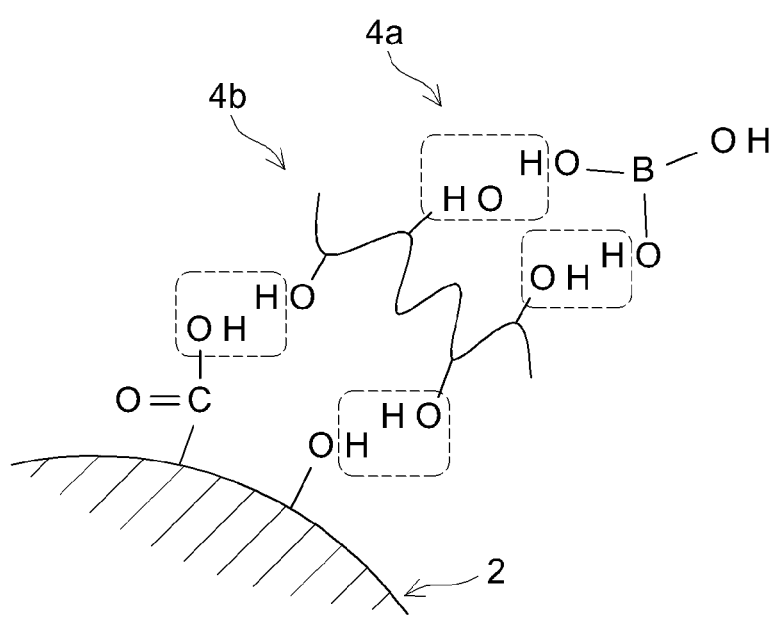
FIG. 3 is an explanatory view for explaining the dehydration condensation in Step 3.

In the present step, the negative electrode active material 2 having the boron compound 4a and the crosslinking agent 4b attached thereto is calcined. FIG. 3 is an explanatory view for explaining dehydration condensation in the present step. As shown in FIG. 3, the calcination causes water desorption between the surface functional group of the negative electrode active material 2 and the crosslinking agent 4b and between the crosslinking agent 4b and the boron compound 4a. As a result, a condensation reaction occurs between the surface functional group of the negative electrode active material 2 and the crosslinking agent 4b and between the crosslinking agent 4b and the boron compound 4a. As a result, as shown in FIG. 2, the surface of the negative electrode active material 2 and the boron are chemically bonded by the crosslinking site having the C—O—C bonding portion.

It is important that the calcination temperature (maximum temperature at the time of calcination) be within a temperature range in which the above dehydration reaction occurs and the boron compound 4a, the crosslinking agent 4b, and the polymer produced by the dehydration reaction be not decomposed. From this viewpoint, the calcination temperature may be determined, for example, on the basis of data of differential thermal-thermogravimetric simultaneous measurement (TG-DTA), so as to realize a one-step reaction. The calcination temperature may be set at about 100° C. or higher, in other words, equal to or higher than the boiling point of water, and lower than about the decomposition temperature of the boron compound 4a, for example, 120° C. to 250° C., preferably 140° C. to 200° C. Further, the calcination atmosphere may be an inert atmosphere (for example, a nitrogen atmosphere).

The negative electrode material 1 including the negative electrode active material 2 and the coating portion 4 disposed on the surface of the negative electrode active material 2 can be manufactured in the above-described manner.

[Negative Electrode for Lithium Secondary Battery]

The negative electrode material 1 is used as a negative electrode of a lithium secondary battery. The negative electrode of a lithium secondary battery typically has a negative electrode current collector and a negative electrode active material layer formed on the negative electrode current collector. The negative electrode current collector is exemplified by a metal foil such as copper. The negative electrode active material layer includes at least the negative electrode material 1. In addition to the negative electrode material 1, the negative electrode active material layer may include, for example, a binder, a thickener, a dispersant, a conductive material, and the like. Examples of the binder include rubbers such as styrene butadiene rubber (SBR) and halogenated vinyl resins such as polyvinylidene fluoride (PVdF). Examples of the thickener include celluloses such as carboxymethylcellulose (CMC).

[Lithium Secondary Battery]

The negative electrode is used for constructing a lithium secondary battery. The lithium secondary battery includes a positive electrode, a negative electrode, and a nonaqueous electrolyte. The positive electrode may be similar to the conventional one and is not particularly limited. The positive electrode typically includes a positive electrode current collector and a positive electrode active material layer formed on the positive electrode current collector. The positive electrode current collector can be exemplified by a metal foil such as aluminum. The positive electrode active material layer includes at least a positive electrode active material. Examples of the positive electrode active material include lithium transition metal composite oxides such as lithium nickel composite oxide, lithium cobalt composite oxide, lithium nickel cobalt composite oxide, lithium manganese composite oxide, and lithium nickel manganese cobalt composite oxide. In addition to the positive electrode active material, the positive electrode active material layer may include, for example, a conductive material, a binder, a dispersant, and the like. Examples of the conductive material include carbon black, typically acetylene black or Ketjen black. Examples of the binder include halogenated vinyl resins such as polyvinylidene fluoride (PVdF) and polyalkylene oxides such as polyethylene oxide (PEO).

The nonaqueous electrolyte may be the same as the conventional one and is not particularly limited. The nonaqueous electrolyte typically includes a supporting salt and a nonaqueous solvent. The nonaqueous electrolyte is typically a nonaqueous electrolytic solution that shows a liquid state at room temperature (25° C.). The supporting salt dissociates in a nonaqueous solvent to produce lithium ions as charge carriers. As the supporting salt, for example, a fluorine-containing lithium salt such as $LiPF_6$, $LiBF_4$ and the like can be mentioned. Examples of the nonaqueous solvent include aprotic solvents such as carbonates, esters, ethers, nitriles, sulfones, and lactones. In addition to the supporting salt and the nonaqueous solvent, the nonaqueous electrolyte may include a film-forming agent such as lithium bis(oxalato)borate (LiBOB), vinylene carbonate (VC), or the like, and a gas-generating agent such as biphenyl (BP), cyclohexylbenzene CHB), or the like.

[Use of Lithium Secondary Battery]

The lithium secondary battery including the negative electrode material 1 in the negative electrode can be used for a variety of applications in which the internal resistance is reduced as compared with the conventional products, and excellent output characteristics and high-rate cycle characteristic are realized. Therefore, the lithium secondary battery disclosed herein can be preferably used, for example, as a motive power source (driving power source) for a motor mounted on a vehicle by making use of such characteristics. The type of the vehicle is not particularly limited and typical examples include automobiles such as plug-in hybrid vehicles (PHV), hybrid vehicles (HV), electric vehicles (EV), and the like. The lithium secondary battery may be used in the form of a battery pack in which a plurality of lithium secondary batteries is connected in series and/or in parallel.

Hereinafter, examples relating to the present invention will be described, but the present invention is not intended to be limited to the features shown in the examples.

TEST EXAMPLE 1

<Preparation of Negative Electrode Material>

EXAMPLES 1 to 4

First, a negative electrode active material (average particle diameter 10 μm, specific surface area 3 $m^2$/g to 4 $m^2$/g) having an R value of 0.2 to 0.74 was prepared. Next, the negative electrode active material, an aqueous solution containing polyvinyl alcohol (PVA, degree of saponification: 90 mol %, degree of polymerization: 1500) as a crosslinking agent, and an aqueous solution including boric acid (decomposition temperature based on TG-DTA is 300° C.) as a boron compound were mixed in mass ratios of the negative electrode active material:PVA:boric acid=100:6.9:2.0, and water was evaporated to dryness. Boric acid and PVA were thus attached to the surface of the negative electrode active material. Next, the negative electrode active material having boric acid and PVA attached thereto was calcined in an inert atmosphere at a calcination temperature of 160° C. In this way, a negative electrode material including a negative electrode active material and a coating portion disposed on the surface thereof and including a dehydration condensate of boric acid and PVA was prepared and used as the negative electrode material.

COMPARATIVE EXAMPLE 1

A negative electrode active material having an R value of 0.12 was used without any modification as a negative electrode material.

COMPARATIVE EXAMPLE 2

A negative electrode active material (having an R value of 0.12) of Comparative Example 1 and an aqueous solution including PVA as a crosslinking agent were mixed at a negative electrode active material:PVA ratio of 100:6.9 on a mass basis, and water was then evaporated to dryness. As a result, PVA was attached to the surface of the negative electrode active material. Next, the negative electrode active material with the PVA attached thereto was calcined at a calcination temperature of 160° C. under an inert atmosphere. A negative electrode material was thus prepared and used as the negative electrode material.

COMPARATIVE EXAMPLE 3

A negative electrode active material (having an R value of 0.12) of Comparative Example 1 and an aqueous solution including boric acid as a boron compound were mixed at a negative electrode active material:boric acid ratio of 100:2.0 on a mass basis, and water was then evaporated to dryness. As a result, boric acid was attached to the surface of the negative electrode active material. The product was used without heat treatment as a negative electrode material.

COMPARATIVE EXAMPLE 4

The negative electrode active material with boric acid attached to the surface which was obtained in Comparative Example 3 was calcined at a calcination temperature of 160° C. under an inert atmosphere. Thus, a negative electrode material was prepared and used as the negative electrode material.

COMPARATIVE EXAMPLE 5

A negative electrode material was prepared in the same manner as in Example 1 except that a negative electrode active material having an R value of 0.12 was used, and the prepared material was used as the negative electrode material.

COMPARATIVE EXAMPLES 6 to 8

Negative electrode materials were prepared in the same manner as in Comparative Examples 2 to 4 except that a negative electrode active material having an R value of 0.2 was used, and the prepared materials were used as the negative electrode material.

COMPARATIVE EXAMPLE 9

A negative electrode material was prepared in the same manner as in Example 1 except that a negative electrode active material having an R value of 0.86 was used, and the prepared material was used as the negative electrode material.

COMPARATIVE EXAMPLE 10

The negative electrode active material with PVA and boric acid attached thereto, which was prepared in Example 2, was used without heat treatment as the negative electrode material.

COMPARATIVE EXAMPLE 11

A negative electrode material was prepared in the same manner as in Example 2 except that the calcination temperature was made 300° C., which is the same as the decomposition temperature of boric acid, and used as the negative electrode material.

<Quantitative Analysis of Coating Portion>

Quantitative analysis of the coating portion of the negative electrode material was carried out. Specifically, first, 10 g of a negative electrode material was collected for each of Examples 1 to 4 and Comparative Examples 5 and 9 and washed with ethyl methyl carbonate (EMC). Next, XPS was measured for the negative electrode material after washing. From the obtained XPS spectrum, curve fitting was performed with respect to the peak Pb of the 1s electron orbital of the boron atom, which appeared at the position of the bond energy of 193 eV to 194 eV, and the peak area Ab was obtained. The peak area Ab was measured after charging correction was performed with the peak (C1s) of is electron orbital of carbon atom taken as 284.80 eV. Next, based on the peak area Ab, the composition ratio (atomic %) of boron atoms was calculated when the total of boron atoms, carbon atoms, and oxygen atoms was taken as 100 atomic %. In this test example, the total of boron atoms, carbon atoms and oxygen atoms corresponds to substantially all atoms. Then, the negative electrode material was converted into the mass of boric acid $(B(OH)_3)$ per 10 g. The obtained results are shown in Table 1.

Next, 10 mg of the negative electrode material after washing was weighed and TG-DTA measurement was carried out. Specifically, the temperature of the negative electrode material was raised from room temperature to 500° C. at a temperature rise rate of 10° C./min in an argon atmosphere. The mass of PVA was calculated from the weight reduction rate at 220° C. to 500° C. at this time. The result was converted into the mass of PVA per 10 g of the negative electrode material. The obtained results are shown in Table 1. Next, the mass ratio of PVA and boric acid in the coating portion was calculated by dividing the mass of the PVA by the mass of the boric acid. The obtained results are shown in Table 1. As shown in Table 1, the mass ratio (feed ratio) at the time of negative electrode preparation is reflected in the mass ratio of PVA and boric acid in the coating portion.

<Analysis of C—O—C Bonding Portion>

XPS was measured with respect to the negative electrode material and the obtained XPS spectrum was used for curve fitting on the peak Pc of the C—O—C bonding portion appearing at a position where the bond energy was 287 eV to 288 eV and finding a peak area Ac. The peak area Ac was measured after conducting charge correction with the peak of C1s taken as 284.80 eV. Then, the result of each example was normalized using the peak area (of only the negative electrode active material) of Comparative Example 10 as a reference (1). The obtained results are shown in Table 1.

<Construction of Lithium Secondary Battery>

For each example, a lithium secondary battery was constructed using the negative electrode material. Specifically, firstly, the negative electrode active material (C) obtained above, styrene butadiene rubber (SBR) as a binder, and carboxymethyl cellulose (CMC) as a thickener were weighed to obtain mass ratios of C:SBR:CMC=100:0.5:0.5 (in terms of solid content) and mixed in ion exchanged water to prepare a negative electrode slurry. The negative electrode slurry was coated on the surface of a strip-shaped copper foil (negative electrode current collector, thickness 10 µm), dried and pressed. A negative electrode having a negative electrode active material layer on a negative electrode current collector was thus produced.

Subsequently, $LiNi_{1/3}Co_{1/3}Mn_{1/3}O_2$ (NCM) as a positive electrode active material, acetylene black (AB) as a conductive material, and polyvinylidene fluoride (PVdF) as a binder were weighed to obtain mass ratios of NCM:AB:PVdF=92:5:3 and mixed in N-methyl-2-pyrrolidone (NMP) to prepare a positive electrode slurry. The positive electrode slurry was coated on the surface of a strip-shaped aluminum foil (positive electrode current collector, thickness 15 µm) to a width of 100 mm, dried and pressed. A positive electrode having a positive electrode active material layer on a positive electrode current collector was thus produced.

Then, the positive electrode and the negative electrode prepared as described above were set opposite to each other with the strip-shaped separator interposed therebetween and wound in the longitudinal direction to prepare a wound electrode body. A porous sheet configured of a base material (average thickness 24 µm) having a three-layer PP/PE/PP structure obtained by laminating polypropylene (PP) on both sides of polyethylene (PE), and a heat resistant layer (average thickness of 4 µm) formed on the surface on one side of the base material was used as the separator. Further, the separator was disposed so that the heat resistant layer faced the negative electrode.

Next, a nonaqueous electrolytic solution was prepared by dissolving $LiPF_6$ as a supporting salt at a concentration of 1.0 mol/L in a mixed solvent including ethylene carbonate (EC), dimethyl carbonate (DMC) and ethyl methyl carbonate (EMC) in volume ratios of EC:DMC:EMC=3:3:4. Then, the prepared electrode body and the prepared nonaqueous electrolytic solution were accommodated in a battery case and sealed. As a result, a lithium secondary battery was constructed.

<Activation Process>

The lithium secondary battery thus constructed was allowed to stand for a while in an environment of 25° C. to impregnate the nonaqueous electrolytic solution. Next, the lithium secondary battery was constant-current charged at a charge rate of 0.1 C until the voltage reached 4.1 V (conditioning). Next, the charged lithium secondary battery was held for a while in an environment of 60° C. (aging).

<Measurement of Initial Resistance (−10° C.)>

After adjusting the lithium secondary battery after the activation treatment to SOC56%, the battery was placed in a thermostatic chamber at −10° C. and allowed to stand for a while. After the temperature of the lithium secondary battery has stabilized, the battery was discharged for 10 sec at a discharge rate of 10 C. The resistance value (Ω) was calculated from the current value and voltage drop amount at this time. The results are shown in the initial resistance column of Table 1. In Table 1, the results are shown as relative values with the resistance value of Comparative Example 1 taken as the reference (100). Smaller numerical values in Table 1 can be said to be preferable because the internal resistance is suppressed.

<Measurement of High-Rate Cycle Characteristic>

After the activation treatment, the lithium secondary battery was placed in a thermostatic chamber at 60° C. and allowed to stand for a while. After the temperature of the lithium secondary battery has stabilized, 500 cycles of high-rate charging and discharging were performed at a charge and discharge rate of 2 C in a voltage range of 0% to 100% SOC. Next, with respect to the lithium secondary battery after the high-rate charging and discharging, the resistance value was measured in the same manner as the initial resistance. Then, the resistance after the high-rate charging and discharging was divided by the initial resistance to calculate the resistance increase rate after the cycling. The results are shown in the resistance increase rate column of Table 1. In Table 1, the results are shown as relative values with the resistance increase rate of Comparative Example 1 taken as the reference (100). Smaller numerical values in Table 1 can be said to be preferable because the internal resistance is suppressed.

TABLE 1

| | Preparation of negative electrode material | | | | | | | XPS evaluation of negative electrode material | | Battery characteristics | |
|---|---|---|---|---|---|---|---|---|---|---|---|
| | | | | | | Quantitative analysis of coating portion | | | | | High-rate cycle |
| | R value of negative electrode active material | PVA addition amount (parts by mass) | Boric acid addition amount (parts by mass) | Mixing ratio (PVA/ boric acid) | Calcination (° C.) | Mass calculated as boric acid (g) | PVA mass (g) | Mass ratio (PVA/ boric acid) | B1s (atm. %) | Area ratio of C—O—C bond | Initial resistance (relative value) | resistance increase rate (relative value) |
| Comparative Example 1 | 0.12 | — | — | — | None | — | — | — | — | — | 100 | 100 |
| Comparative Example 2 | 0.12 | 6.9 | — | — | 160° C. | — | — | — | — | — | 103 | 99 |
| Comparative Example 3 | 0.12 | — | 2 | — | None | — | — | — | — | — | 101 | 100 |
| Comparative Example 4 | 0.12 | — | 2 | — | 160° C. | — | — | — | — | — | 99 | 102 |

TABLE 1-continued

| | Preparation of negative electrode material | | | | | Quantitative analysis of coating portion | | | XPS evaluation of negative electrode material | | Battery characteristics | |
|---|---|---|---|---|---|---|---|---|---|---|---|---|
| | R value of negative electrode active material | PVA addition amount (parts by mass) | Boric acid addition amount (parts by mass) | Mixing ratio (PVA/boric acid) | Calcination (° C.) | Mass calculated as boric acid (g) | PVA mass (g) | Mass ratio (PVA/boric acid) | B1s (atm. %) | Area ratio of C—O—C bond | Initial resistance (relative value) | High-rate cycle resistance increase rate (relative value) |
| Comparative Example 5 | 0.12 | 6.9 | 2 | 3.46 | 160° C. | 0.2 | 0.68 | 3.40 | 0.23 | 1.6 | 98 | 103 |
| Comparative Example 6 | 0.2 | 6.9 | — | — | 160° C. | — | — | — | — | — | 103 | 99 |
| Comparative Example 7 | 0.2 | — | 2 | — | None | — | — | — | — | — | 102 | 101 |
| Comparative Example 8 | 0.2 | — | 2 | — | 160° C. | — | — | — | — | — | 98 | 99 |
| Example 1 | 0.2 | 6.9 | 2 | 3.46 | 160° C. | 0.2 | 0.68 | 3.42 | 0.38 | 3.3 | 94 | 95 |
| Example 2 | 0.41 | 6.9 | 2 | 3.46 | 160° C. | 0.2 | 0.69 | 3.47 | 0.38 | 3.4 | 94 | 94 |
| Example 3 | 0.56 | 6.9 | 2 | 3.46 | 160° C. | 0.2 | 0.69 | 3.43 | 0.39 | 3.3 | 94 | 97 |
| Example 4 | 0.74 | 6.9 | 2 | 3.46 | 160° C. | 0.2 | 0.69 | 3.42 | 0.39 | 3.8 | 95 | 96 |
| Comparative Example 9 | 0.86 | 6.9 | 2 | 3.46 | 160° C. | 0.2 | 0.68 | 3.41 | 0.38 | 5.6 | 99 | 99 |
| Comparative Example 10 | 0.41 | 6.9 | 2 | 3.46 | None | — | — | — | 0.38 | 1 | 104 | 103 |
| Comparative Example 11 | 0.41 | 6.9 | 2 | 3.46 | 300° C. | — | — | — | 0.04 | 1.9 | 102 | 101 |

Examples 1 to 4 are test examples in which the R value of the negative electrode active material is 0.2 to 0.74 and the dehydration condensate of boric acid and PVA is provided on the surface of the negative electrode active material. As shown in Table 1, in Examples 1 to 4, the initial resistance was suppressed relatively low and the high-rate cycle characteristic was also excellent. The following reasons why the initial resistance was suppressed low in Examples 1 to 4 can be considered: (1) the number of reaction starting points on the surface of the negative electrode active material was increased by setting the R value of the negative electrode active material to a predetermined value or more, and (2) the introduction of PVA on the surface of the negative electrode active material increased the number of reaction starting points, and the amount of boron atoms further increased in the vicinity of the negative electrode active material. The following reasons why the increase in resistance after the high-rate cycling was suppressed in Examples 1 to 4 can be considered: (1) reduction decomposition of the nonaqueous electrolyte could be suppressed by setting the R value of the negative electrode active material to a predetermined value or less, and (2) the bonding property between the negative electrode active material and boron was further strengthened by introducing PVA together with boric acid on the surface of the negative electrode active material.

By contrast with these test examples, in Comparative Examples 1 to 11 in which one or more of the following conditions was not fulfilled, the initial resistance was relatively high and the high-rate cycle characteristic was also poor. These conditions are: the R value of the negative electrode active material does not satisfy the above range; boric acid and/or PVA is not used; calcination step (dehydration condensation step) is not performed; and the calcination temperature in the calcination step is equal to or higher than the decomposition temperature of boric acid.

For example, in Comparative Examples 2 and 6 in which no boric acid was used, the initial resistance was higher than that of Comparative Example 1 in which the negative electrode active material was used as it was. The reason for this is apparently that the surface of the negative electrode active material was covered with PVA which inhibited the storage and release of lithium ions by the negative electrode active material. Further, in Comparative Examples 2 and 6, the high-rate cycle characteristics were also the same as in Comparative Example 1.

Further, for example, in Comparative Examples 4 and 8 in which PVA was not used, although the initial resistance was slightly improved compared with Comparative Example 1, the high-rate cycle characteristic was the same as that of Comparative Example 1. The reason for this is apparently that when PVA is not used, the bond between the negative electrode active material and boron becomes physical adsorption as described in WO 2014/162529 or hydrogen bonding with weak bonding force. Therefore, it is conceivable that boron has separated from the surface of the negative electrode active material after the high-rate cycling.

Further, in Comparative Example 5 in which the R value of the negative electrode active material was small, although the initial resistance was slightly improved as compared with Comparative Example 1, the high-rate cycle characteristic was worse than in Comparative Example 1. The reason for this is apparently that the effect of the technique disclosed herein could not be appropriately exhibited and the amount of boron atoms has decreased near the negative electrode active material due to a small number of reaction starting points. In Comparative Example 9 in which the R value of the negative electrode active material was large, both the initial resistance and the high-rate cycle characteristic were the same as those of Comparative Example 1. The reason for this is apparently that the presence of a large amount of surplus surface functional groups on the surface of the negative electrode active material caused the decomposition of the nonaqueous electrolytic solution for which these functional groups acted as starting points, which resulted in the formation of a high-resistance film including the decomposition product of the nonaqueous electrolytic solution on the surface of the negative electrode active material.

Further, in Comparative Example 10 which did not include the calcination step and Comparative Example 11 in which the calcination temperature was high, both the initial resistance and the high-rate cycle characteristic have deteriorated as compared with Comparative Example 1. The reason for this is apparently that in Comparative Example 10, since the peak Pc of the bonding portion of C—O—C was small, the condensation reaction of the surface functional group of the negative electrode active material and PVA and the condensation reaction of PVA and boric acid did not progress. Further, in Comparative Example 11, since the peak of B is was practically not detected, it is conceivable that boric acid was decomposed as a result of heating.

TEST EXAMPLE 2

In Examples 5 to 10 and Comparative Examples 12 to 15, negative electrode materials were prepared and used as the negative electrode material in the same manner as in Example 2 except that the addition amount of PVA or boric acid with respect to 100 parts by mass of the negative electrode active material was changed as shown in Table 2. Then, quantitative analysis of the coating portion, construction of the lithium secondary battery, and characteristic evaluation were carried out. The results are shown in Table 2. In Table 2, the ratio Ac/Ab of the area Ac of the peak Pc of the C—O—C bonding portion to the area Ab of the peak Pb of the boron atom in the XPS spectrum is also shown.

the above range, the effect of the technique disclosed herein was not appropriately exhibited. The reason for this is apparently that in Comparative Examples 13 and 15, the proportion of PVA to boric acid was excessive, and the surface of the negative electrode active material was covered with PVA which inhibited the storage and release of lithium ions. Meanwhile, in Comparative Examples 12 and 14, the proportion of PVA to boric acid was insufficient, the cross-linking property between boric acid and the negative electrode active material was lowered, and the amount of boron atoms on the surface of the negative electrode active material tended to decrease or boron atoms tended to separate from the negative electrode active material. The above results support the technical significance of the technique disclosed herein.

Although specific examples of the present invention have been described in detail above, they are merely illustrative and do not limit the scope of the claims. Techniques described in the claims include those in which the concrete examples exemplified above are variously modified and changed.

The terms and expressions used herein are for description only and are not to be interpreted in a limited sense. These terms and expressions should be recognized as not excluding any equivalents to the elements shown and described herein and as allowing any modification encompassed in the scope of the claims. The preferred embodiments disclosed herein

TABLE 2

| | Preparation of negative electrode material | | | | | Quantitative analysis of coating portion | | | XPS evaluation of negative electrode material | | | Battery characteristics | |
|---|---|---|---|---|---|---|---|---|---|---|---|---|---|
| | | PVA | Boric acid | | | | | | | | | | High-rate cycle |
| | R value of negative electrode active material | addition amount (parts by mass) | addition amount (parts by mass) | Mixing ratio (PVA/boric acid) | Calcination (° C.) | Mass calculated as boric acid (g) | PVA mass (g) | Mass ratio (PVA/boric acid) | Area ratio (Ac/Ab) | B1s (atm. %) | Area ratio of C—O—C bond | Initial resistance (relative value) | resistance increase rate (relative value) |
| Comparative Example 1 | 0.12 | — | — | — | None | — | — | — | — | — | — | 100 | 100 |
| Comparative Example 10 | 0.41 | 6.9 | 2 | 3.46 | None | — | — | — | 0.01 | 0.38 | 1 | 104 | 103 |
| Comparative Example 11 | 0.41 | 6.9 | 2 | 3.46 | 300° C. | — | — | — | 1.8 | 0.4 | 1.9 | 102 | 101 |
| Comparative Example 12 | 0.41 | 1.0 | 2 | 0.50 | 160° C. | 0.2 | 0.10 | 0.50 | 0.03 | 0.38 | 0.32 | 99 | 99 |
| Example 5 | 0.41 | 2.0 | 2 | 1.00 | 160° C. | 0.2 | 0.20 | 1.00 | 0.21 | 0.38 | 2.1 | 94 | 95 |
| Example 6 | 0.41 | 5.0 | 2 | 2.50 | 160° C. | 0.2 | 0.50 | 2.52 | 0.28 | 0.38 | 2.8 | 95 | 96 |
| Example 7 | 0.41 | 10.0 | 2 | 5.00 | 160° C. | 0.2 | 1.01 | 4.98 | 0.42 | 0.39 | 4.2 | 96 | 97 |
| Comparative Example 13 | 0.41 | 15.0 | 2 | 7.50 | 160° C. | 0.2 | 1.52 | 7.60 | 0.58 | 0.38 | 5.8 | 104 | 98 |
| Comparative Example 14 | 0.41 | 6.9 | 13.9 | 0.50 | 160° C. | 1.4 | 0.69 | 0.49 | 0.05 | 2.68 | 3.5 | 99 | 100 |
| Example 8 | 0.41 | 6.9 | 6.9 | 1.00 | 160° C. | 0.7 | 0.69 | 1.00 | 0.11 | 1.32 | 3.6 | 88 | 96 |
| Example 9 | 0.41 | 6.9 | 2.8 | 2.50 | 160° C. | 0.3 | 0.70 | 2.46 | 0.27 | 0.54 | 3.8 | 90 | 95 |
| Example 10 | 0.41 | 6.9 | 1.4 | 5.00 | 160° C. | 0.1 | 0.69 | 4.89 | 0.51 | 0.27 | 3.6 | 96 | 94 |
| Comparative Example 15 | 0.41 | 6.9 | 0.9 | 7.50 | 160° C. | 0.1 | 0.70 | 7.51 | 0.81 | 0.18 | 3.8 | 102 | 100 |

Figure 4:
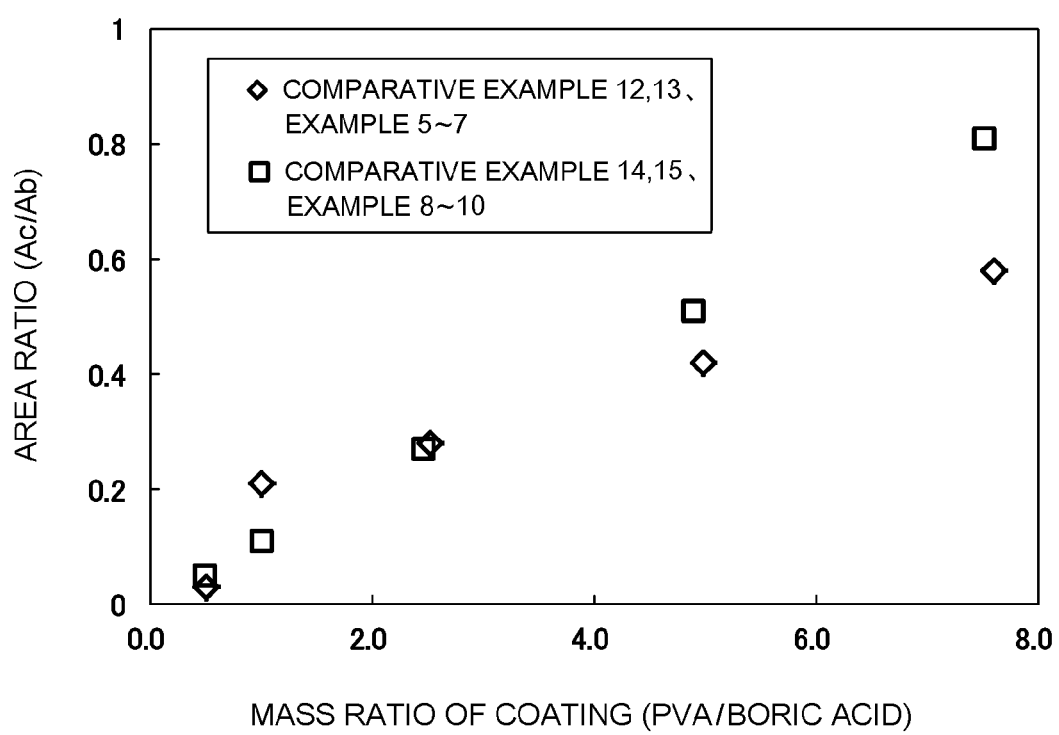
FIG. 4 is a graph showing the relationship between the mass ratio (PVA/boric acid) of the coating portion and the area ratio (Ac/Ab) of XPS.

FIG. 4 is a graph showing the relationship between the mass ratio (PVA/boric acid) of the coating portion and the area ratio (Ac/Ab) of XPS described above. As shown in Table 2 and FIG. 4, a correlation having a correlation coefficient $R^2$ of 0.93 or more was obtained between the Ac/Ab ratio and the mass ratio of the coating portion. Also, as shown in Table 2, when the Ac/Ab ratio was in the range of 0.11 to 0.51, the effect of the technique disclosed herein was appropriately exhibited. Meanwhile, in Comparative Examples 12 to 15 in which the Ac/Ab ratio did not satisfy may be embodied in many various forms. This disclosure should be regarded as providing preferred embodiments of the principle of the invention. These preferred embodiments are provided with the understanding that they are not intended to limit the invention to the preferred embodiments described in the specification and/or shown in the drawings. The invention is not limited to the preferred embodiment described herein. The invention disclosed herein encompasses any of preferred embodiments including equivalent elements, modifications, deletions, combinations, improvements and/or alterations which can be recognized by a person of ordinary skill in the art based on the disclosure. The elements of each claim should be interpreted broadly based on the terms used in the claim, and should not be limited to any of the preferred embodiments described in this specification or used during the prosecution of the present application.

What is claimed is:

1. A negative electrode material for a lithium ion secondary battery, comprising:
a negative electrode active material which includes a carbon material and in which a ratio $I_D/I_G$ of an intensity $I_D$ of a D peak appearing at a position of 1350 cm$^{-1}$ to an intensity $I_G$ of a G peak appearing at a position of 1580 cm$^{-1}$ in a Raman spectrum measured by laser Raman spectroscopy using an argon laser is 0.2 or more and 0.74 or less; and
a coating portion disposed on a surface of the negative electrode active material, wherein
the coating portion includes:
a boron atom, and
a crosslinking site having a C—O—C bonding portion and interposed between the boron atom and the negative electrode active material; and
in an XPS spectrum measured by X-ray photoelectron spectroscopy,
when an area of the peak of the 1s electron orbital of the boron atom, which appears at a position with a bond energy of 193 eV to 194 eV, is denoted by Ab, and
an area of the peak of the C—O—C bonding portion, which appears at a position with a bond energy of 287 eV to 288 eV, is denoted by Ac
the ratio Ac/Ab of the peak area Ac of the C—O—C to the peak area Ab of the boron atom is 0.11 or more and 0.51 or less.

2. The negative electrode material according to claim 1, wherein
a composition ratio of the boron atoms calculated based on the peak area Ab of the XPS spectrum is 0.27 atomic % or more when a total of all atoms is 100 atomic %.

3. The negative electrode material according to claim 1, wherein
the coating portion includes a dehydration condensate of a boron compound, having a hydroxyl group, and a polyol.

4. The negative electrode material according to claim 1, wherein
the coating portion includes a dehydration condensate of boric acid and polyvinyl alcohol.

5. The negative electrode material according to claim 4, wherein
a mass ratio of the polyvinyl alcohol to the boric acid is 1 to 5.

6. The negative electrode material according to claim 1, wherein
the negative electrode active material is amorphous coated graphite.

7. A lithium secondary battery comprising the negative electrode material according to claim 1 as a negative electrode.

* * * * *